United States Patent [19]
Umemoto et al.

[11] Patent Number: 5,231,657
[45] Date of Patent: Jul. 27, 1993

[54] CORDLESS TELEPHONE SYSTEM THAT RELEASES HOLD STATE OF HANDSET AFTER INTRUSION BY ANOTHER PARTY IS DETECTED

[75] Inventors: Yuji Umemoto; Koichi Ito, both of Tokyo, Japan

[73] Assignee: Kabushiki Kaisha Toshiba, Kawasaki, Japan

[21] Appl. No.: 628,895

[22] Filed: Dec. 18, 1990

[30] Foreign Application Priority Data

Dec. 18, 1989 [JP] Japan .................................. 1-327975

[51] Int. Cl.⁵ ............................................ H04M 11/00
[52] U.S. Cl. ........................................ 379/61; 379/58; 379/194
[58] Field of Search ................. 379/61, 184, 194, 168, 379/195, 58, 62, 63, 199

[56] References Cited

U.S. PATENT DOCUMENTS

| | | | |
|---|---|---|---|
| 4,230,914 | 10/1980 | Korwin et al. | 379/195 |
| 4,920,557 | 4/1990 | Umemoto | 379/61 |
| 5,040,204 | 8/1991 | Sasaki et al. | 379/61 |

FOREIGN PATENT DOCUMENTS

| | | | |
|---|---|---|---|
| 3434686 | 4/1986 | Fed. Rep. of Germany | 379/61 |
| 0149160 | 6/1990 | Japan | 379/61 |

OTHER PUBLICATIONS

Illegal Phone, Dak Industries Inc, Sep. 1984, p. 60.

*Primary Examiner*—Curtis Kuntz
*Assistant Examiner*—George J. Oehling
*Attorney, Agent, or Firm*—Banner, Birch, McKie & Beckett

[57] ABSTRACT

A cordless telephone system includes a base unit connected to both a subscriber line and at least one branch telephone, and a mobile unit capable of being coupled to the base unit over a radio link. In the event that the handset of a branch telephone is switched on after a speech communication link has been established between the mobile unit and the subscriber line, an alarm may be provided to the user of the mobile unit. In addition, the user of the mobile unit may place the system in a holding state after a speech communication link has been established whereby the base unit and mobile unit maintain the speech communication link, but the mouthpiece of the mobile unit is disabled. In the event that the handset of a branch telephone is switched on, while the system is in a holding state, an alarm signal may be generated and output to a loud speaker at the mobile unit, and the mobile unit may be released from its holding state.

10 Claims, 5 Drawing Sheets

CORDLESS TELEPHONE SYSTEM THAT RELEASES HOLD STATE OF HANDSET AFTER INTRUSION BY ANOTHER PARTY IS DETECTED

BACKGROUND OF THE INVENTION

The present invention relates to a cordless telephone system wherein a base unit connected to a subscriber line establishes radio frequency links with at least one mobile unit and, more particularly, to a cordless telephone system wherein a speech communication link established between a user of a mobile unit and another party by way of the subscriber line and the radio link may not be monitored by the user of a base unit or the user of a branch telephone connected to the base unit without automatically notifying the user of the mobile unit.

DESCRIPTION OF THE RELEVANT ART

At present, several types of cordless telephone systems are available on the market. In one type of cordless telephone system, a base unit and a mobile unit are provided. The base unit is connected to a subscriber line and may be equipped with a handset or connected to a branch telephone. A user at the base unit may establish a speech communication link with another party via the subscriber line and may enter into conversation using the handset or the branch telephone. In addition, a user of the mobile unit may establish a speech communication link with another party via the subscriber line by forming a radio link between the base unit and the mobile unit.

According to the conventional cordless telephone system, when a speech communication link has been established between the user of a mobile unit and another party, another user may hear the conversation taking place on the speech communication link by switching on the handset provided at the base unit or the handset of the branch telephone. In this event, a user of the mobile unit who is engaged in conversation with another party is not notified that the conversation is being monitored by the user at the base unit.

SUMMARY OF THE INVENTION

It is an object of the present invention to provide a cordless telephone system wherein undesirable monitoring by the user of a branch telephone of a conversation between the user of the mobile unit and another user may be prevented.

It is a further object of the present invention to provide a cordless telephone system wherein a user of the mobile unit being in conversation with another party may be notified that a handset is switched on at the base unit or the branch telephone.

To achieve these objectives, as embodied and described herein, the invention includes a cordless telephone system having a base unit connected both to a subscriber line and at least one branch telephone, and a mobile unit capable of being coupled to the base unit over a radio link. A speech communication link may thereby be established between the mobile unit and another party by way of the subscriber line and the radio link. An alarm signal may be generated and provided on the speech communication link in the event that a branch telephone is switched on after the speech communication link has been established. The user of the mobile unit may then hear the alarm signal through an earpiece or speaker provided at the mobile unit.

According to another embodiment of the invention, the user of the mobile unit may place the system in a holding state after the speech communication link has been established whereby the base unit and mobile unit maintain the radio link and the subscriber line connection, but the mouthpiece of the mobile unit is disabled so that the party to whom the user of the mobile unit was in communication may not hear the user. In the event that a branch telephone is switched on, an alarm signal may be generated and output to a loud speaker at the mobile unit, and the mobile unit may be released from its holding state.

Some of the problems and deficiencies of the conventional cordless telephone discussed above are therefore solved by the principles of the present invention.

DETAILED DESCRIPTION OF THE PREFERRED EMBODIMENT

A preferred embodiment of the present invention will be described with reference to the accompanying drawings.

Figure 1:
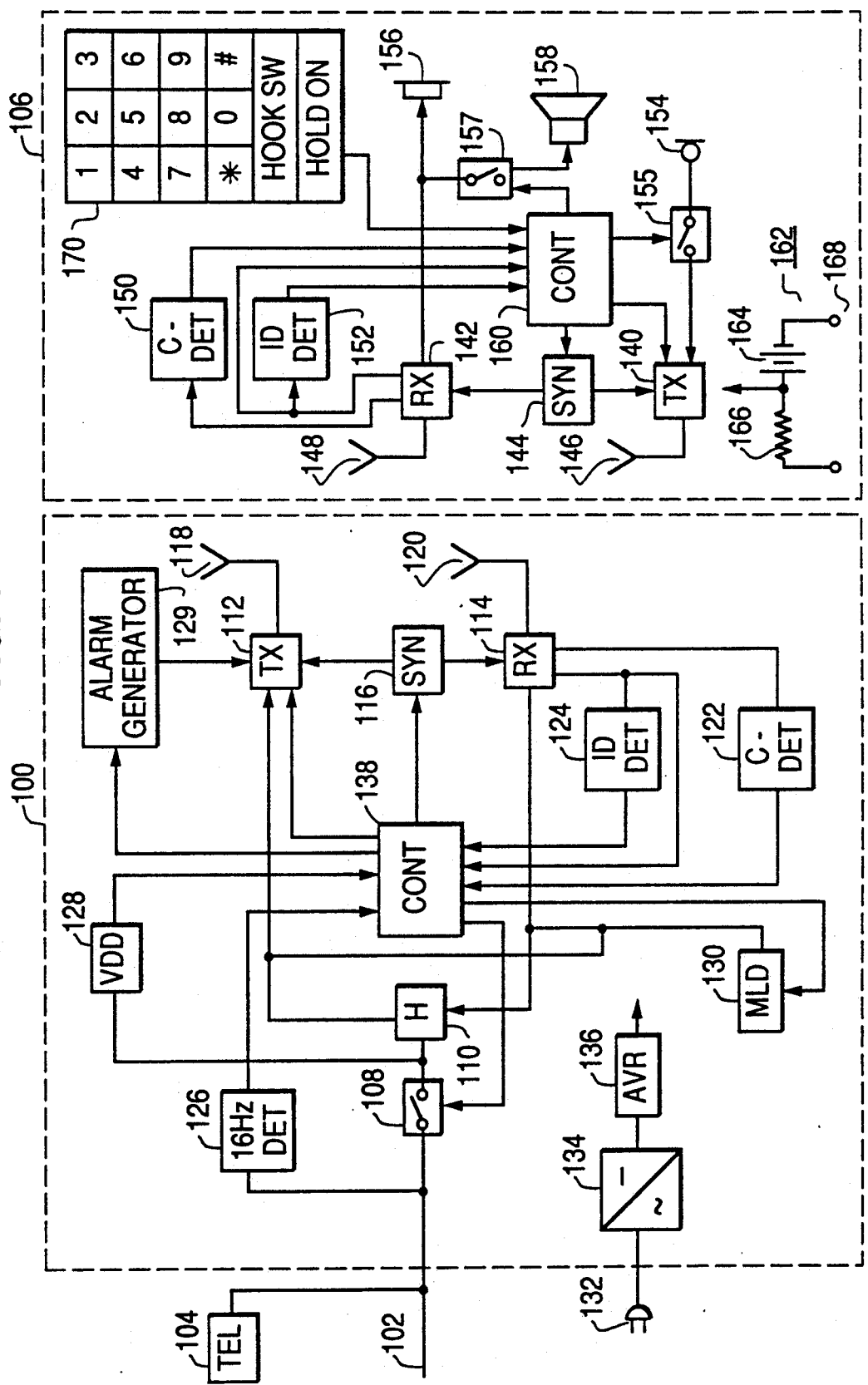
FIG. 1 is a schematic block diagram of a cordless telephone system according to one embodiment of the present invention.

FIG. 1 shows a schematic block diagram of a cordless telephone system according to one embodiment of the present invention. In FIG. 1, a base unit 100 is connected to a subscriber line 102. The subscriber line 102 is also connected to a branch telephone 104. A mobile unit 106 may be coupled to the base unit 100 over a radio link.

The base unit 100 comprises a loop switch 108, a hybrid circuit 110, a transmitter 112, a receiver 114, a synthesizer 116, antennas 118 and 120, a channel detector 122, an ID detector 124, a sixteen (16) Hz ring signal detector 126, a voltage drop detector 128, an alarm generator 129, a melody generator 130, a plug 132, a transducer 134, a regulator 136, and a controller 138.

The mobile unit 106 comprises a transmitter 140, a receiver 142, a synthesizer 144, antennas 146 and 148, a channel detector 150, an ID detector 152, a mouth piece 154, a mouth piece switch 155, an ear piece 156, a speaker switch 157, a speaker 158, a controller 160, a power supply circuit 162, and a key pad 170 containing various switches.

The base unit 100 is supplied power from a commercial power supply via plug 132. The transducer 134 converts alternating current from the plug 132 to direct current. The regulator 136 regulates the output voltage of the transducer 134 and applies the regulated voltage to each section of the base unit 100.

The mobile unit 106 is supplied power by the power supply circuit 162. The power supply circuit 162 includes a rechargeable battery 164, a resistor 166, and charging terminals 168. When the mobile unit 106 is mounted on a charger (not shown), the unit is supplied power from the charger. Otherwise, the unit is supplied power from the battery 164.

Responsive to an incoming signal from the subscriber line, a control channel radio link is formed between the base unit 100 and the mobile unit 106 and a ring tone is generated at the mobile unit 106 and the branch telephone. When a user thereafter activates the mobile unit 106, the loop switch 108 is closed and a speech channel radio link is formed between the base unit 100 and the mobile unit 106, resulting in a speech communication link being established between the calling party and the user of the mobile unit 106. The operation of this aspect of the system is described in detail in U.S. Pat. No. 4,920,557, the inventor of which is one of the inventors of the present invention and the assignee of which is the same company as that of the present application.

Alternatively, a user of the mobile unit 106 may originate a telephone call to another user via the radio link and subscriber line. In this case, a speech communication link may be established between the mobile unit and the called party in a similar manner as described above for incoming calls. Thereafter, the key pad 170 may be utilized in conjunction with the controller 160 and the transmitter 140 to transmit the desired dialing codes to the base unit 100 for transmission over the subscriber line 102.

Figure 2:
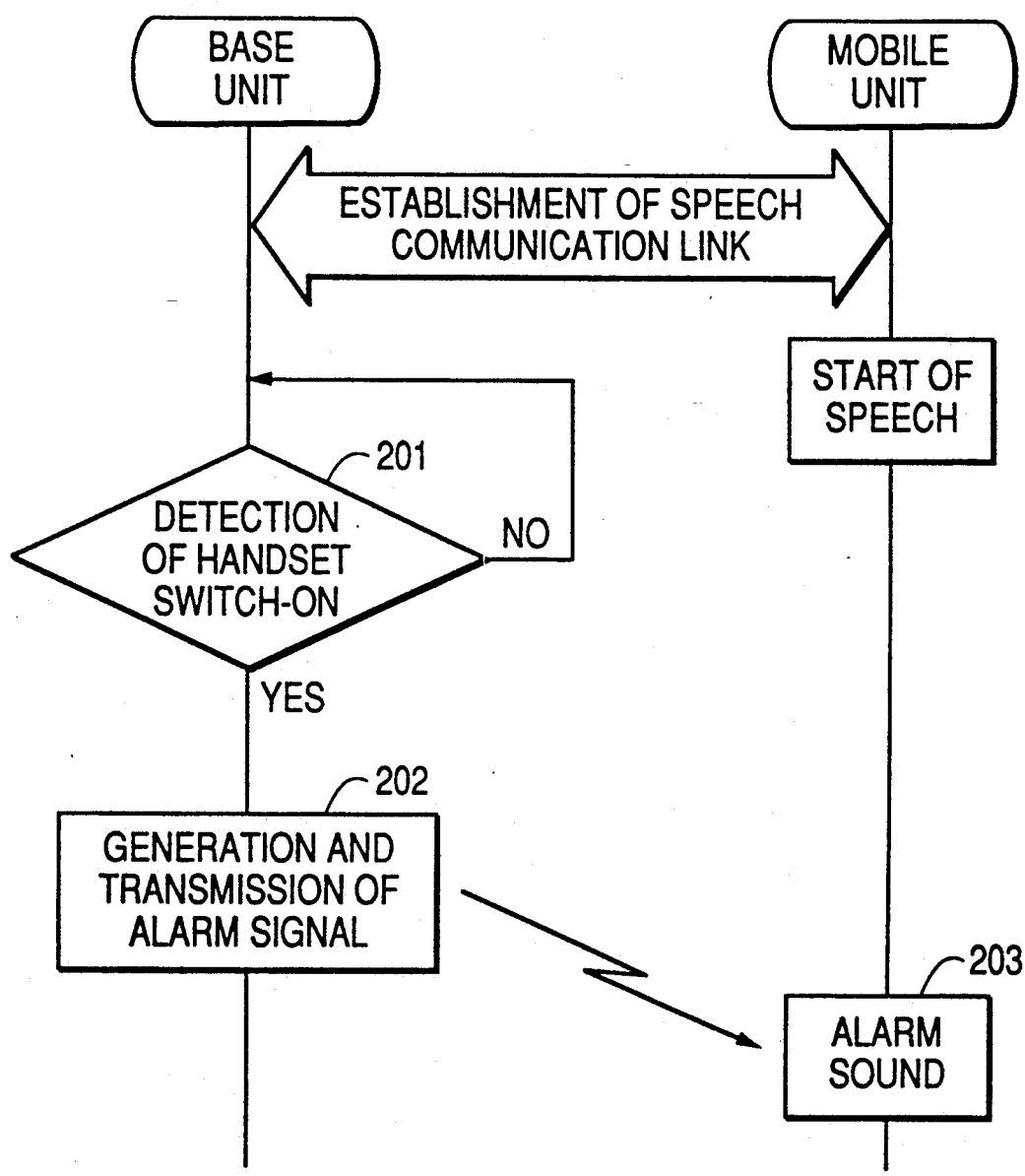
FIG. 2 is a flowchart explaining the operation of the cordless telephone system shown in FIG. 1.

FIG. 2 shows a flowchart which reveals the operation of the system after the establishment of the speech communication link in accordance with one embodiment of the present invention. Details of the operation of the present invention before a speech communication link has been established are described in detail in U.S. Pat. No. 4,920,557 to Umemoto.

Referring to both FIGS. 1 and 2, the controller 138 checks at a predetermined interval whether a detection signal is applied thereto from the voltage drop detector 128 (step 201). The voltage drop detector 128 generates the detection signal when the voltage of the line coupled to the subscriber line 102 drops by a certain magnitude. Upon receipt of the detection signal, the controller 138 controls the alarm generator so as to generate an alarm composed of a tone signal. The alarm signal is applied to the transmitter 112, modulated therein, and transmitted to the mobile unit 106 via the antenna 118 (step 202). Thus, the alarm signal is mixed into a speech signal on the speech communication link.

The receiver 142 of the mobile unit 106 receives the alarm signal mixed into the speech signal. The received alarm signal is demodulated and outputted to the ear piece 156 creating an audible alarm indication (step 203).

Figure 3:
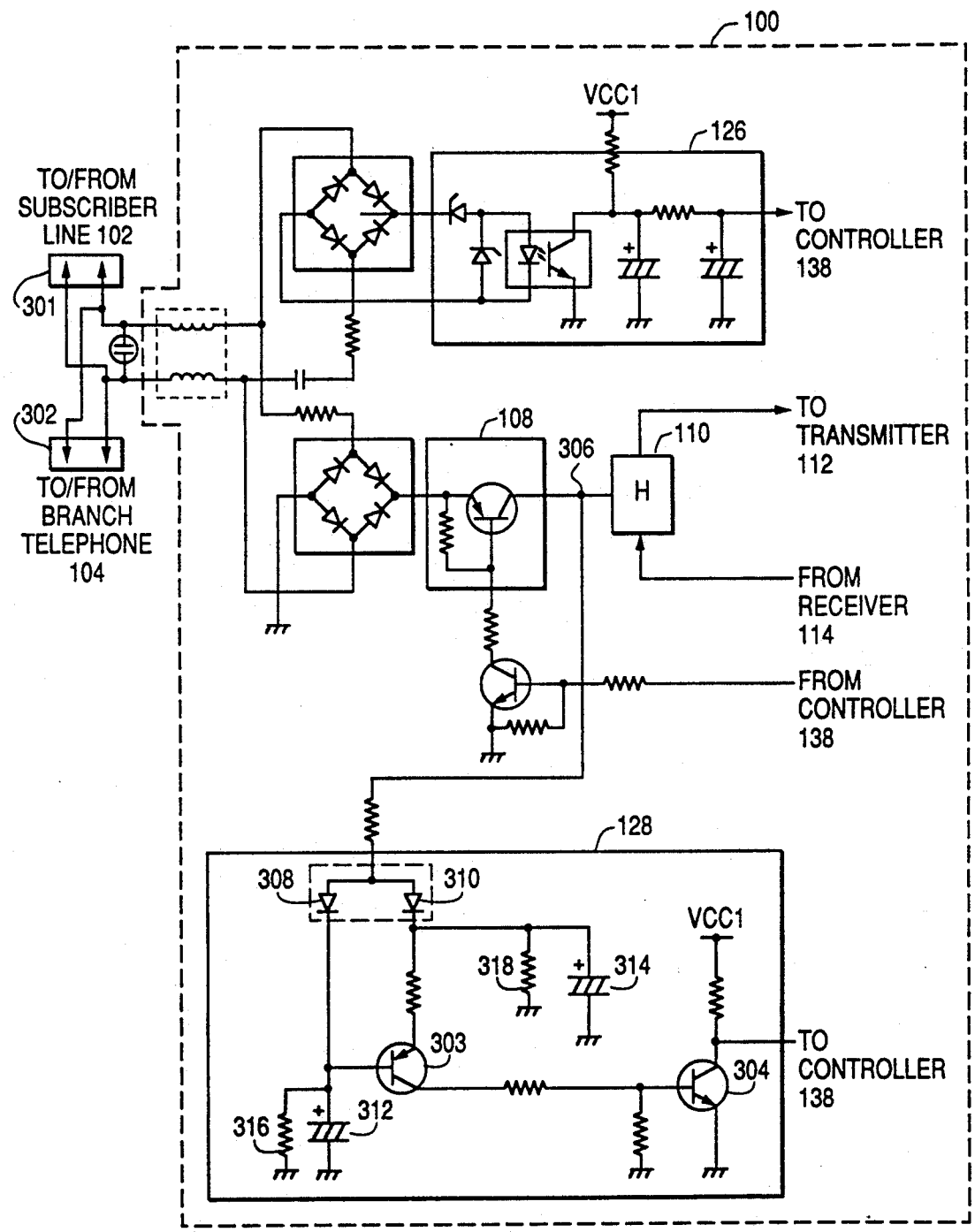
FIG. 3 is a block diagram of one aspect of the block diagram shown in FIG. 1.

FIG. 3 shows in further detail the base unit 100 of FIG. 1. The base unit 100 is connected to the subscriber line 102 via a connector jack 301. The subscriber line 102 is also connected to the branch telephone 104 via a connector jack 302. The 16 Hz ring signal from the subscriber line 102 may be detected in the signal detector 126 by means of optical coupling. When a speech communication link is established between a user of the mobile unit 106 and another party and the handset of the branch telephone 104 is switched off, the voltage applied to the base of the transistor 303 in the voltage drop detector 128 becomes equal to the voltage applied to the emitter of the transistor 303, which is approximately 5 volts. In this event, both of the transistors 303 and 304 are turned off. Consequently, the collector of the transistor 304 becomes equal to $V_{cc1}$ and this on-state signal is applied to the controller 138.

When the handset of the branch telephone 104 is switched on, the voltage of node 306 drops by approximately 3 volts, thereby turning the diodes 308 and 310 off. In this event, the voltage of the capacitor 312 is applied to the base of the transistor 303 and the voltage of the capacitor 314 is applied to the emitter of the transistor 303. The elemental values of the capacitor 312, the capacitor 314, the resistor 316, and the resistor 318 are selected so that the voltage applied to the base is reduced more abruptly than the voltage to the emitter. When the voltage applied to the base is reduced to a level lower than the voltage applied to the emitter by 0.6 volts, the transistor 303 turns on, thereby turning on the transistor 304. Consequently, an off-state signal is applied to the controller 138.

When the voltage of the capacitor 312 decreases below the voltage of node 306, the diode 308 turns on. Subsequently, both of the transistor 303 and transistor 304 are turned off. As a result, an on-state signal is applied to the controller 138.

As is apparent from the above-mentioned discussion, in response to a voltage drop at node 306, an off-state signal having a specified duration is applied to the controller 138. The controller 138, responsive to the off-state signal, causes the alarm generator 129 to generate an alarm signal.

Figure 4:
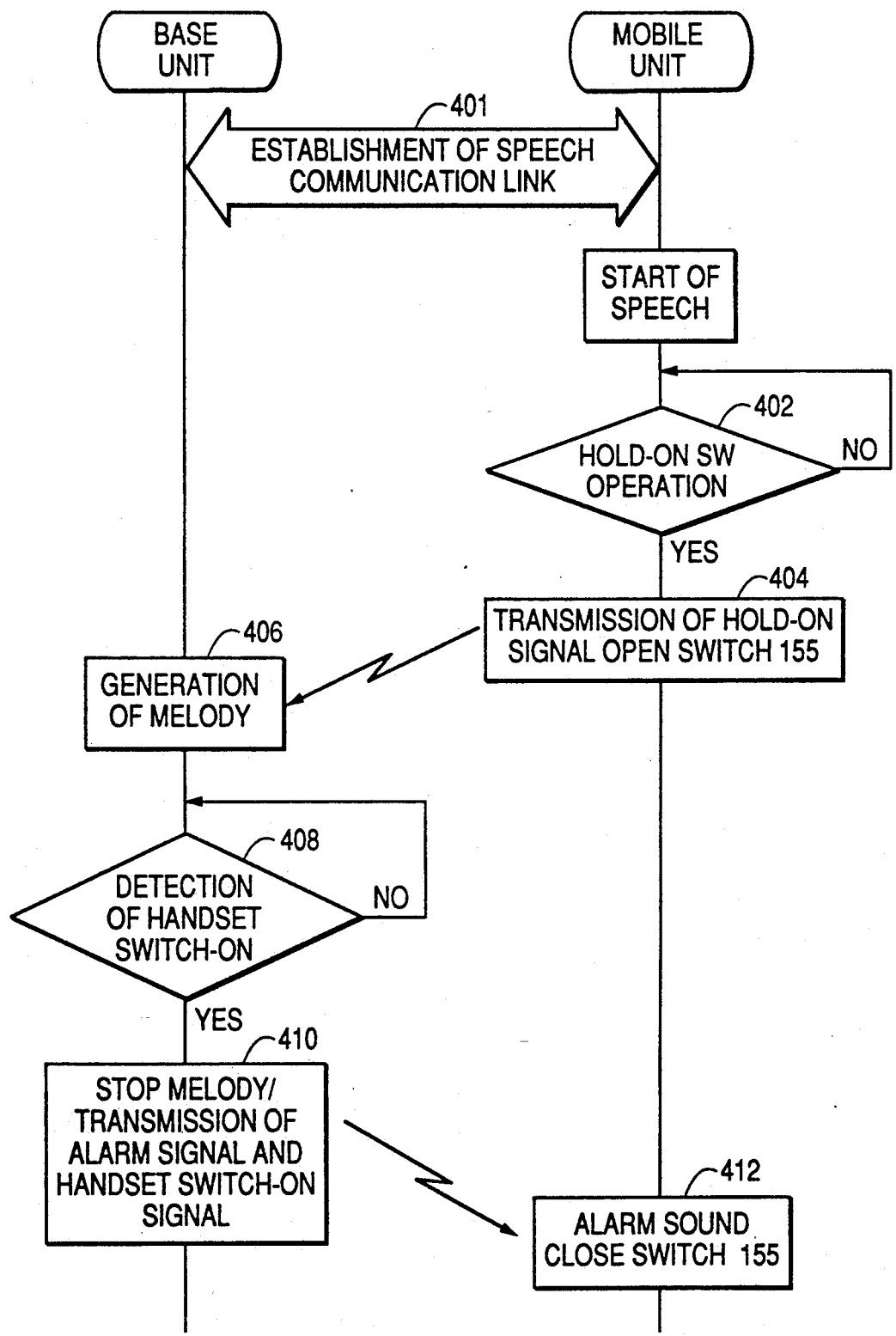
FIG. 4 is a flowchart explaining another operation of the cordless telephone system shown in FIG. 1.

In another embodiment of the present invention, a user of the mobile unit 106 is able to place the system in a "hold-on" state during the use of the speech communication link whereby the base unit 100 and the mobile unit 106 maintain the radio link and the subscriber line 102 connection, but the mouthpiece 154 of the mobile unit is disabled so that the party to whom the user of the mobile unit was in communication may not hear the user. FIG. 4 shows a flowchart which illustrates the operation of the present invention during the hold-on state. After a speech communication link is established between the user of the mobile unit 106 and another party through the radio link and subscriber line 102 (step 401), the user of the mobile unit may initiate a hold-on operation by depressing the hold-on switch on the key pad 170 (step 402). Responsive to the hold-on operation, the controller 138 activates the switch 155 so that the microphone 154 is disconnected from the transmitter 140 and directs the transmitter to transmit a hold-on signal to the base unit 100 (step 404). Upon reception of the hold-on signal, the controller 138 at the base unit 100 causes the melody generator 130 to generate a melody which is supplied to the transmitter 118 and the subscriber line 102 (step 406).

When a user switches on the handset of the branch telephone 104, the voltage drop detector 128 detects a voltage drop due to the presence of the active handset in the branch telephone 104 (step 408) and sends a detection signal to the controller 138. Responsive to this detection signal, the controller 138 directs the melody generator 130 to stop generating the melody and causes the alarm generator 129 to generate an alarm signal to be transmitted to the mobile unit 106 by transmitter 112 (step 410). In addition, the controller 138 directs the transmitter 112 to transmit a signal to the mobile unit 106 indicating that the branch telephone handset has been switched on (step 410).

Upon reception of this signal by the receiver 142 of the mobile unit 106, the controller 160 (1) activates switch 155 so that the mouthpiece 154 is coupled to the transmitter 140 thereby releasing the system from the hold-on state and (2) activates switch 157 so that received signals are applied to the loud speaker 158 in addition to the earpiece 156. As a result, the alarm signal transmitted from the base unit 100 is applied to the loud speaker 158, and an alarm is sounded (step 412).

According to the above-mentioned embodiments, a user of the mobile unit who is communicating with another party through a radio link and the subscriber line 102 may be notified, by an alarm sound, that the branch telephone handset has been switched on. Hearing the alarm sound, the user may then terminate the communication link or change the contents of the conversation accordingly.

Furthermore, in the event that the branch telephone handset is switched on after the user of the mobile unit places the system in a hold-on state while communicating with another party through the radio link and subscriber line, the mobile unit 106 is released from the hold-on state and an alarm sound is generated through the loud speaker 158. Therefore, the user of the mobile unit may be notified of the activation of the branch telephone handset and tell the user at the branch telephone that the cordless telephone system is already being used.

Figure 5:
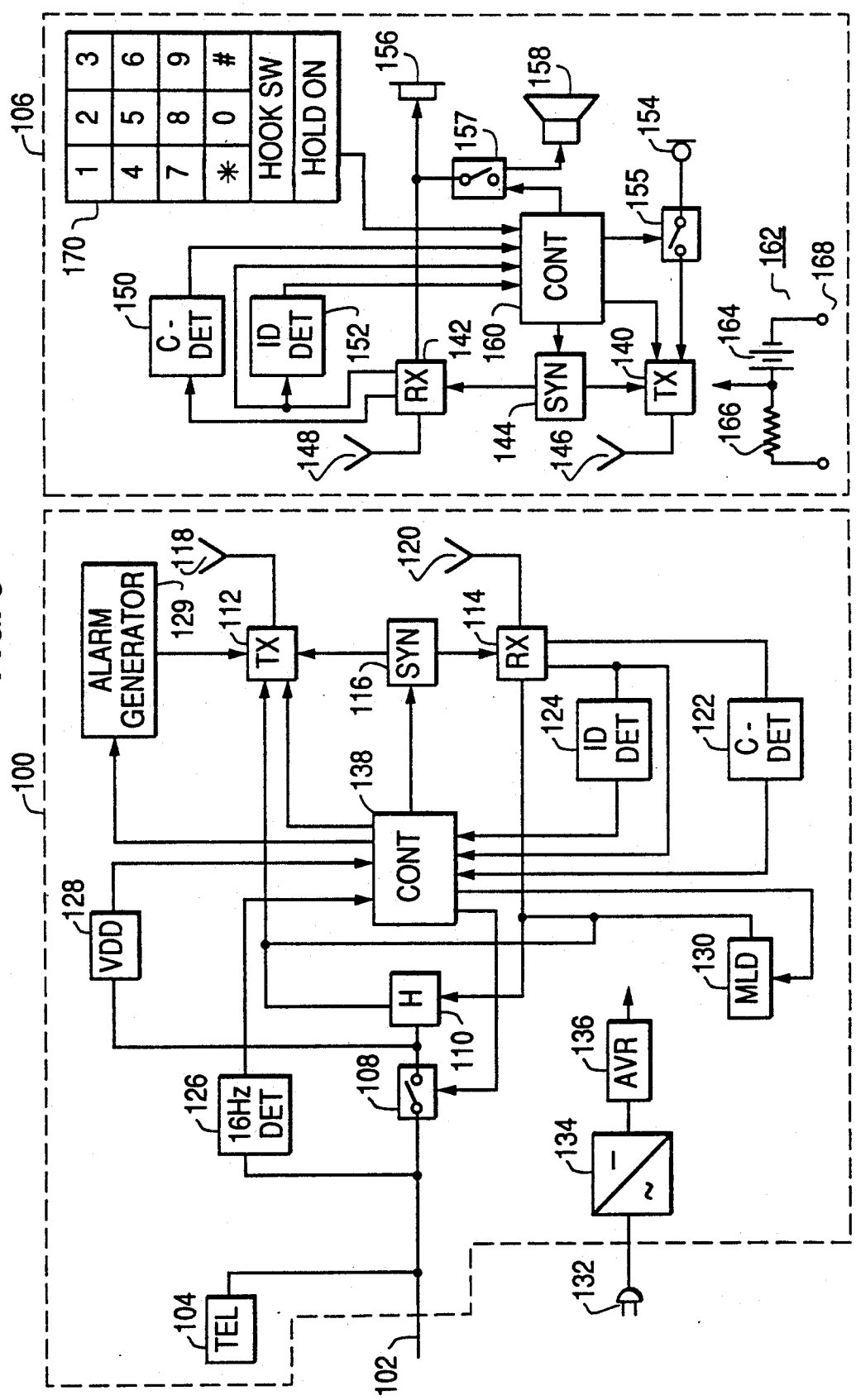
FIG. 5 is a schematic block diagram of a cordless telephone system according to another embodiment of the present invention.

Although a preferred embodiment of present invention has been described, it will be apparent that the invention is not limited to the specific construction and operation shown but is susceptible to various changes and modifications without departing from the scope of the novel concepts of the invention as defined in the accompanying claims. For example, instead of utilizing a branch telephone independent of the base unit 100, as depicted in FIG. 5, the base unit could include a branch telephone handset, in which case the branch telephone 104 of FIG. 1 would be included within the base unit 100. In this case, a handset switch could be provided at the base unit. In addition, although the alarm sound consists of a tone signal in the above embodiment, the alarm could also be, for example, an artificially synthesized voice which may be produced by well-known voice synthesis techniques.

We claim:

1. In a cordless telephone system having a base unit and a mobile unit, the base unit capable of being connected to a subscriber line and at least one branch telephone, and the mobile unit capable of being coupled to the base unit over a radio link, a method of generating an alarm comprising the steps of:
   establishing the radio link between the base unit and the mobile unit, thereby establishing a speech communication link between the mobile unit and the subscriber line;
   disabling a mouthpiece of the mobile unit while maintaining the speech communication link;
   detecting at the base unit a switched-on state of the at least one branch telephone;
   generating an alarm signal at the base unit when the switched-on state of the at least one branch telephone is detected;
   transmitting from the base unit the alarm signal over the speech communication link;
   receiving at the mobile unit the alarm signal from the speech communication link; and
   re-enabling the mouthpiece of the mobile unit in response to the received alarm signal at the mobile unit.

2. The alarm generating method of claim 1, further comprising the step of:
   sounding an alarm at the mobile unit in response to the received alarm signal.

3. A cordless telephone system comprising:
   a mobile unit; and
   a base unit coupled to a subscriber line and at least one branch telephone, said base unit comprising:
      radio link establishing means for establishing a radio link to the mobile unit, and thereby establishing a speech communication link between the mobile unit and the subscriber line;
      detecting means for detecting a switched-on state of the at least one branch telephone;
      alarm generating means, responsive to said detecting means, for generating an alarm signal indicating the switched-on state of the at least one branch telephone; and
      transmitting means for transmitting the alarm signal to the mobile unit,
   said mobile unit comprising:
      disabling means for selectively disabling transmission of speech signals from the mobile unit while maintaining the speech communication link;
      receiving means for receiving the alarm signal;
      means for generating an alarm indication in response to the received alarm signal; and
      means responsive to the received alarm signal for re-enabling the transmission of speech signals from said mobile unit.

4. The cordless telephone system according to claim 3, wherein said detecting means comprises a voltage drop detector.

5. The cordless telephone system according to claim 3, wherein said means for generating an alarm indication comprises a speaker.

6. In a cordless telephone system having a base unit and a mobile unit, the base unit capable of being connected to a subscriber line and having a handset, and the mobile unit capable of being coupled to the base unit over a radio link, a method of generating an alarm comprising the steps of:
   establishing the radio link between the base unit and the mobile unit, thereby establishing a speech communication link between the mobile unit and the subscriber line;
   disabling a mouthpiece of the mobile unit while maintaining the speech communication link;
   detecting at the base unit a switched-on state of the handset;
   generating an alarm signal at the base unit when the switched-on state of the handset is detected;
   transmitting from the base unit the alarm signal over the speech communication link;
   receiving at the mobile unit the alarm signal from the speech communication link; and
   re-enabling the mouthpiece of the mobile unit in response to the received alarm signal at the mobile unit.

7. The alarm generating method of claim 6, further comprising the step of:
   sounding an alarm at the mobile unit in response to the received alarm signal.

8. A cordless telephone system comprising:
   a mobile unit; and
   a base unit coupled to a subscriber line, said base unit comprising:
   a handset;

radio link establishing means for establishing a radio link to the mobile unit, and thereby establishing a speech communication link between the mobile unit and the subscriber line;

detecting means for detecting a switched-on state of the handset;

alarm generating means, responsive to said detecting means, for generating an alarm signal indicating the switched-on state of the handset; and transmitting means for transmitting the alarm signal to the mobile unit, said mobile unit comprising:

disabling means for selectively disabling transmission of speech signals from the mobile unit while maintaining the speech communication link;

receiving means for receiving the alarm signal;

means for generating an alarm indication in response to the received alarm signal; and means responsive to the received alarm signal for re-enabling the transmission of speech signals from said mobile unit.

9. The cordless telephone system according to claim 8, wherein said detecting means comprises a voltage drop detector.

10. The cordless telephone system according to claim 8, wherein said means for generating an alarm indication comprises a speaker.

* * * * *